United States Patent
Kaine et al.

(10) Patent No.: US 6,920,010 B2
(45) Date of Patent: Jul. 19, 2005

(54) MAGNETIC RECORDING APPARATUS

(75) Inventors: Mutsuhito Kaine, Ehime (JP); Hiroaki Kojima, Ehime (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 449 days.

(21) Appl. No.: 09/889,373

(22) PCT Filed: Mar. 2, 2001

(86) PCT No.: PCT/JP01/01616

§ 371 (c)(1),
(2), (4) Date: Oct. 16, 2001

(87) PCT Pub. No.: WO01/65556

PCT Pub. Date: Sep. 7, 2001

(65) Prior Publication Data

US 2002/0154437 A1 Oct. 24, 2002

(30) Foreign Application Priority Data

Mar. 2, 2000 (JP) .................... 2000-057593

(51) Int. Cl.[7] ............................. G11B 5/596
(52) U.S. Cl. .................... 360/77.03; 360/78.11
(58) Field of Search .................... 360/77.03, 75, 360/78.11; 369/44.36, 47.17, 44.29, 124.02, 89.1, 275.4, 112.01

(56) References Cited

U.S. PATENT DOCUMENTS

| | | | | |
|---|---|---|---|---|
| 5,636,201 A | * | 6/1997 | Ooki ..................... | 369/275.4 |
| 5,892,741 A | * | 4/1999 | Kadowaki et al. ....... | 369/44.29 |
| 5,946,283 A | * | 8/1999 | Kobori et al. .......... | 369/124.02 |
| 6,009,054 A | * | 12/1999 | Kadowaki et al. ....... | 369/44.36 |
| 6,128,155 A | * | 10/2000 | Sugawara et al. ....... | 360/78.11 |
| 6,327,110 B1 | * | 12/2001 | Sano et al. ............ | 360/77.03 |
| 6,327,235 B1 | * | 12/2001 | Hayashi ................. | 369/59.1 |
| 6,407,378 B1 | * | 6/2002 | Sakaguchi ............. | 250/231.13 |
| 6,442,114 B1 | * | 8/2002 | Ishibashi et al. ........ | 369/47.17 |
| 6,504,667 B1 | * | 1/2003 | Sugawara ............... | 360/75 |
| 6,563,662 B2 | * | 5/2003 | Smith .................... | 360/77.03 |
| 6,574,066 B1 | * | 6/2003 | Stubbs et al. .......... | 360/77.03 |
| 6,580,580 B1 | * | 6/2003 | Kojima et al. .......... | 360/77.03 |
| 6,628,599 B2 | * | 9/2003 | Maeda et al. .......... | 369/112.01 |

FOREIGN PATENT DOCUMENTS

| | | |
|---|---|---|
| EP | 0753851 | 7/1996 |
| JP | 3-252925 | 11/1991 |
| JP | 5-81687 | 4/1993 |
| JP | 11-175990 | 7/1999 |

OTHER PUBLICATIONS

Alan B. Marchant, "Optical Recording", 1990, pp. 178–179.

* cited by examiner

*Primary Examiner*—Sinh Tran
*Assistant Examiner*—Fred F. Tzeng
(74) *Attorney, Agent, or Firm*—Wenderoth, Lind & Ponack, L.L.P.

(57) ABSTRACT

A magnetic recording apparatus which, even when crosstalk occurs between signals from three photosensitive parts of a photodetector, can detect a high-precision tracking error signal with stability. In a signal processing unit which processes electrical signals outputted from a photosensitive part of a photodetector to detect a tracking error signal, an output signal from and I-V converting unit is subjected to voltage division by voltage-dividing units, and voltage-divided output signals and output signals from I-V converting units are subjected to differential calculation by differential arithmetic units, respectively.

6 Claims, 8 Drawing Sheets

… are tracks, and Gn−1, Gn, Gn+1 … are guide
MAGNETIC RECORDING APPARATUS

TECHNICAL FIELD

The present invention relates to a magnetic recording apparatus which can detect a high-precision tracking error signal with stability, and can accurately record, reproduce or delete information on/from a magnetic recording medium, such as a fixed magnetic disk or a floppy disk.

BACKGROUND ART

Conventionally, in a magnetic disk system which records information on a magnetic recording medium, a track pitch of approximately 200 µm has been employed and this is very broad as compared with a track pitch of approximately 1.6 µm on an optical recording medium, and mechanically rough track positioning has been performed using a stepping motor or the like. However, in recent years, a track pitch of several µm~several tens of µm has been desired in order to realize greater capacity. In this case, a mechanism for more accurate track positioning than in the conventional magnetic system is necessitated.

FIG. 3 shows a structure of a conventional magnetic recording apparatus which detects a tracking error signal by using light. In FIG. 3, the conventional magnetic recording apparatus has an emission beam 70 (hereinafter, referred to as a "beam") of linear polarized light; a semiconductor laser light source 1 (hereinafter, referred to as a "light source" which outputs the beam 70; a diffraction element 16 by which the beam 70 outputted from the light source 1 is branched into three beams; a magnetic recording medium 4 (hereinafter, referred to as a "disk"); an objective lens 17 which condenses the beam 70 passing through the diffraction element 16 onto the disk 4; a support 21 which supports the objective lens 17 and is able to adjust the position of the objective lens 17 in a Z direction in order to accurately fix the focus position on the disk 4; a photodetector 15 which receives the beam 70, which is reflected and diffracted by the disk 4 to pass through the objective lens 17 again and is branched at the diffraction element 16, to output an electrical signal in accordance with the quantity of received light; a signal processing unit 61 which processes the electrical signal outputted from the photodetector 15 to output a tracking error signal; a magnetic head 14 which receives the tracking error signal outputted from the signal processing unit 61, and performs recording and reproduction of a tracking error signal detecting optical system and information; an aperture 2 for narrowing the beam 70 which passes through the objective lens 17, to an appropriate spot size on the disk 4; a base 13 where the magnetic head 14 and the aperture 2 are formed; and a driving unit 91 which adjusts the relative position of the disk 4 and the base 13.

In the diffraction element 16, a region 16A is formed on the surface of the side close to the light source 1, and a region 16B is formed on the surface of the opposite side. The emission beam of linear polarized light which is outputted from the light source 1 is incident on the region 16A of the diffraction element 16, and branches into three beams, i.e., a zero-order diffracted beam and ±1st order diffracted beams. Three beams generated on the region 16A further branch into plural beams on the region 16B. In an optical path which leads from the light source 1 to the objective lens 17, a grating pitch of the region 16B is designed such that only the zero-order diffracted beam among the diffracted beams generated on the region 16B is incident on the aperture of the objective lens 17. Further, the beam 70, which is reflected and diffracted by the disk 4 to be incident on the region 16B of the diffraction element 16, branches into plural diffracted beams, and only the ±1st order diffracted beams of these beams are received by the photodetector 15.

FIG. 4 shows the relationship between the disk and the converged beam in the conventional magnetic recording apparatus. As shown in FIG. 4, on the disk 4, guide grooves are formed in the middle of the respective adjacent tracks (regions where information is recorded or reproduced by the magnetic head 14), and a difference in reflectivity between the guide grooves and the other parts allows the tracking error signal to be optically detected. In FIG. 4, Tn−1, Tn, Tn+1 … are tracks, and Gn−1, Gn, Gn+1 … are guide grooves. The track pitch pt and the width of the guide grooves are set to be 20 µm and 2 µm, respectively. Further, in order to obtain a periodic signal according to the rotation of the disk 4, these guide grooves are intermittently formed also in the circumferential direction. When the disk 4 rotates at 720 rpm, the pitch pt' in the circumferential direction is set so that the frequency of the periodic signal obtained by the guide groove crossing the beam 70 in the circumferential direction becomes 20 kHz.

In the beam 70, a beam 70A is a zero-order diffracted beam generated on the region 16A of the diffraction element 16, and beams 70B and 70C are ±1st order diffracted beams generated on the region 16A of the diffraction element 16. Three beams 70A–70C are spaced at pt/4 intervals to the guide groove on the disc 4, respectively.

FIGS. 5(a) and 5(b) show grating patterns of the diffraction element in the conventional magnetic recording apparatus, and FIG. 5(c) shows the relationship between the photodetector and the beams in the conventional magnetic recording apparatus. As shown in FIGS. 5(a) and 5(b), each of the grating patterns formed on the regions 16A and 16B of the diffraction element 16 is a pattern of a constant pitch. The grating patterns on the region 16A and on the region 16B rectangularly cross each other. As shown in FIG. 5(c), ±1st order diffracted beams 71 and 72 received by the photodetector 15 comprise three beams 71A–71C and 72A–72C, respectively. The photodetector 15 has six photosensitive parts 15A–15F, and the beam 71A is received by the photosensitive part 15B, the beam 71B is received by the photosensitive part 15A, the beam 71C is received by the photosensitive part 15C, the beam 72A is received by the photosensitive part 15E, the beam 72B is received by the photosensitive part 15D, and the beam 72C is received by the photosensitive part 15F.

As shown in FIG. 5(c), the light source 1 is arranged on the photodetector 15 that is fabricated on an etched silicon substrate. Further, a mirror 150 is formed on the silicon substrate, and the beam 70 which is outputted from the light source 1 is reflected at the mirror 150 to be outputted in the z-axis direction perpendicular to an X-Y plane where the photosensitive parts 15A–15F of the photodetector 15 are formed.

FIG. 6 is a circuit block diagram of the signal processing unit 61 in the conventional magnetic recording apparatus. As shown in FIG. 6, the photosensitive parts 15A, 15B and 15C (or 15D, 15E and 15F) of the photodetector 15 are connected to current-voltage converting units 355, 354 and 353 (hereinafter, referred to as I-V converting units for short), respectively. Thereby, the electrical signals outputted from the photosensitive parts 15A, 15B and 15C (or 15D, 15E and 15F) of the photodetector 15 are converted into voltage signals by the I-V converting units 355, 354 and 353, respectively. The voltage signal v5 (or v6, v7) outputted from the I-V converting units 355, 354 or 353 becomes a periodic signal of 20 kHz as shown in FIG. 7(a), in a state where the disk 4 is rotating. At this time, a maximum value of v5, v5", is an output value in a state where there is no guide groove within the beam. A minimum value of v5, v5', is an output value in a state where the disk 4 rotates and thereby the beam rests on the guide groove. When the beam center coincides with the center of the guide groove in the X direction, |v5"−v5'| takes the maximum value.

When the beam 70 is being displaced in proportion to time t in a state where the disk 4 is rotating, v5 (or v6, v7) is as shown in FIG. 7(b). On the other hand, when the beam 70 has a displacement x from the center of the guide groove (e.g., Gn) of the disk 4, an envelope curve v5' (or v6', v7') of the minimum value of the 20 kHz periodic signal has such a waveform that the envelope curves are approximately represented by formulas (1)–(3), respectively.

$$v5'=A1 \cdot \cos(2\pi x/pt)+B1 \quad \text{formula (1)}$$

$$v6'=A2 \cdot \sin(2\pi x/pt)+B2 \quad \text{formula (2)}$$

$$v7'=-A3 \cdot \sin(2\pi x/pt)+B3 \quad \text{formulas (3)}$$

In formulas (1)–(3), A1–A3 are amplitudes, and B1–B3 are DC components. Here, a ratio of the amplitude to the DC component in each of v5'–v7', that is, A1/B1 (or A2/B2, A3/B3) is referred to as a modulation factor MOD. As shown in FIG. 6, the I-V converting units 353 and 354 are connected to a differential arithmetic unit 374 through variable gain amplifying units 476, 477 and envelope curve detecting units 356, 357, respectively. Thereby, the voltage signals v5 and v6 outputted from the I-V converting units 353 and 354 are adjusted in the variable gain amplifying units 476 and 477 such that the maximum amplitudes (A1+B1 shown in FIG. 7(b)) of the periodic signals become equal to each other, and then detected as displacement signals v5' and v6' in the envelope curve detecting units 356 and 357, respectively. The displacement signals v5' and v6' are subjected to differential calculation in the differential arithmetic unit 374, and the result is outputted as a voltage signal v8. Further, the voltage signals v4 and v7 outputted from the I-V converting units 354 and 355 are adjusted in the variable gain amplifying units 478 and 479 such that the maximum amplitudes of the periodic signals become equal to each other, and then detected as displacement signals v5' and v7' in the envelope curve detecting units 358 and 359, respectively. The displacement signals v5' and v7' are subjected to differential calculation in the differential arithmetic unit 375, and the result is outputted as a voltage signal v9.

The voltage signals v8 and v9 outputted from the differential arithmetic units 374 and 375 have sine waves where the respective phases differ from each other by π/2 as represented by formulas (4) and (5), respectively.

$$v8=A4 \cdot \sin(2\pi x/pt+\pi/4) \quad \text{formula (4)}$$

$$v9=A4 \cdot \sin(2\pi x/pt-\pi/4) \quad \text{formula (5)}$$

In formulas (4) and (5), A4 is an amplitude. The differential arithmetic units 374 and 375 are connected to an arithmetic unit 433 through variable gain amplifying units 474 and 475, respectively. Thereby, the voltage signals v8 and v9 outputted from the differential arithmetic units 374 and 375 are adjusted to have desired amplitudes in the variable gain amplifying units 474 and 475, respectively, and thereafter, these voltage signals are added in the arithmetic unit 433 to be outputted as a voltage signal v10. The voltage signal v10 has a waveform as represented by formula (6) and is outputted from an output terminal 403 as the tracking error signal.

$$v10 = K3 \cdot A4 \cdot \sin(2\pi x/pt+\pi/4) + K4 \cdot A4 \cdot \sin(2\pi x/pt-\pi/4)$$
$$= K3 \cdot A4 \cdot \sin(2\pi x/pt+\Phi 1) + K3 \cdot A4 \cdot \sin(2\pi x/pt+\pi/2+\Phi 1)$$

In formula (6), K3 and K4 are gains of the variable gain amplifying units 474 and 475, respectively, and Φ1 is −π/4. The tracking error signal v10 becomes a signal having arbitrary phase and amplitude by suitably selecting the gains K3 and K4.

Next, a tracking operation in the magnetic recording apparatus so constructed will be described.

As shown in FIG. 3, the emission beam 70 of the linear polarized light outputted from the light source 1 is incident on the region 16A of the diffraction element 16 and branches into three beams, a zero-order diffracted beam and ±1st order diffracted beams. Three beams so generated on the region 16A further branch into plural beams on the region 16B. However, only zero-order diffracted beams among the diffracted beams generated on the region 16B are incident on the aperture of the objective lens 17. These three diffracted beams 70A–70C are converged on the disk 4 by the objective lens 17 (FIG. 4). The beams 70A–70C, which are reflected and diffracted by the disk 4, pass through the objective lens 17 again, are incident on the region 16B of the diffraction element 16, and branch into plural diffracted beams. Only ±1st order diffracted beams 71A–71C and 72A–72C of the branched diffracted beams are received by the photosensitive parts 15A–15F of the photodetector 15 (FIG. 5(c)). The photosensitive parts 15A–15F of the photodetector 15 output electrical signals according to the quantities of the respective light beams received, to the signal processing unit 61 (FIG. 6). The electrical signal is processed by the signal processing unit 61, and outputted as a tracking error signal to the driving unit 91. On receipt of the tracking error signal, the driving unit 91 adjusts the relative position of the base 13, which includes the optical system and the magnetic head 14, and the disk 4. Thereby, tracking is performed on the desired track.

However, in the conventional magnetic recording apparatus so constructed, since the signal separation characteristics of the photosensitive parts 15A–15F of the photodetector 15 are not necessarily securable enough on the structure, crosstalk of several percent has occurred between the output signals from the photosensitive parts 15A and 15B (or 15D and 15E), or the photosensitive parts 15B and 15C (or 15E and 15F). Further, with miniaturization or the like of devices in these days, opportunities where device components are closely arranged have increased. Therefore, crosstalk between the signals is inevitable to some extent, due to influences of interconnections in the signal processing unit (flexible substrate, a pattern of PCB or the like). When the crosstalk ratio between the output signals is ε, the modulation factor MOD of the above-mentioned signal v5' (or v6', v7') is a value represented by Formula 1.

$$MOD=\{\sqrt{(1+\epsilon\cos \alpha)}-\sqrt{\epsilon\cos \alpha}\}/\{\sqrt{(1+\epsilon\cos \alpha)}+\sqrt{\epsilon\cos \alpha}\} \quad \text{Formula 1}$$

In Formula 1, α is a phase difference of 20 kHz frequency waveforms between the output signals. When the circumferential direction pitch of guide grooves on the disk is pt' and the beam interval is d, α is represented by formula (7).

$$\alpha=2\pi \times d/pt' \quad \text{formula (7)}$$

However, since the periodic signal is always constant (20 kHz) regardless of the beam position on the disk, the circumferential direction pitch pt' of guide grooves on the disk 4 varies according to the positions of the guide grooves in the radial direction on the disk. In the case of an 3.5-inch disk that rotates at 720 rpm, the circumferential direction pitch pt' successively varies so as to result in pt'=80 µm on the most internal circumference of the magnetic recording region and pt'=160 µm on the most external circumference. On the other hand, since the beam interval d is always constant, the phase difference α of the periodic signal varies on the internal and external circumferences of the disk in inverse proportion to the circumference pitch pt' as represented by the formula (7).

Accordingly, as shown by Formula 1, since the modulation factor MOD is represented by a function of the phase difference, α, the modulation factor MOD varies on the internal and external circumferences of the disk. Therefore, the phase difference between the signals v8 and v9, which difference is inherently to be $\pi/2$, has errors to $\pi/2$, resulting in tracking errors.

The present invention is made to solve the above-described problems and has, for its object, to provide a magnetic recording apparatus with reduced tracking errors.

SUMMARY OF THE INVENTION

A magnetic recording apparatus according to a first aspect of the present invention comprises: a disk-shaped information recording medium on which periodic physical changes providing changes of reflectivity are formed; a light source which outputs a light beam; a diffraction element which receives the beam outputted from the light source and generates three beams; a light-converging optical system which converges the beams generated by the diffraction element on the information recording medium as a microspot; a photodetection means having three photosensitive parts which receive beams reflected and diffracted by the information recording medium and again transmitted in the aperture of the light-converging optical system, and output signals in accordance with the quantities of received light beams, respectively; a signal processing means which processes the signals outputted from the photodetection means to output a tracking error signal; a driving means which receives the tracking error signal outputted from the signal processing means, and determines a position of the beam on a desired track; a magnetic head which records information on the information recording medium, or reproduces or deletes information from the information recording medium; wherein the signal processing means includes a cancel means which cancels crosstalk that occurs between the signals outputted from three photosensitive parts of the photodetection means.

According to the present invention, crosstalk which occurs between photodetection signals can be canceled, an influence of crosstalk between signals on tracking error is reduced, and a high-precision tracking error signal can be detected.

Further, according to a second aspect of the magnetic recording apparatus, the signal processing means cancels crosstalk which occurs between signals by the cancel means, and detects a tracking error signal with reduced error.

According to the present invention, crosstalk which occurs between photodetection signals can be canceled, an influence of crosstalk between signals on tracking error detection is reduced, and a high-precision tracking error signal can be detected.

Further, according to a third aspect of the magnetic recording apparatus, the cancel means cancels crosstalk from at least a signal among the three signals outputted from the photodetection means, to the other signal.

According to the present invention, crosstalk which occurs between photodetection signals can be canceled, an influence of crosstalk between signals on tracking error detection is reduced, and a high-precision tracking error signal can be detected.

Further, according to a fourth aspect of the magnetic recording apparatus, the cancel means comprises: first and second voltage-dividing means which perform voltage division on an output signal from a first photosensitive part of the photodetection means; a first differential arithmetic means which performs differential calculation on an output signal from a second photosensitive part of the photodetection means and an output signal from the first voltage-dividing means; a second differential arithmetic means which performs differential calculation an output signal from a third photosensitive part of the photodetection means and an output signal from the second voltage-dividing means.

According to the present invention, crosstalk which occurs between photodetection signals can be canceled, an influence of crosstalk between signals on tracking error detection is reduced, and a high-precision tracking error signal can be detected.

Further, according to a fifth aspect of the magnetic recording apparatus, the first and second voltage-dividing means have voltage-dividing ratios approximately equal to the ratio at which the output signal from the first photosensitive part crosstalks to the output signals from the second and third photosensitive parts.

According to the present invention, crosstalk which occurs between photodetection signals can be canceled, an influence of crosstalk between signals on tracking error detection is reduced, and a high-precision tracking error signal can be detected.

Further, according to a sixth aspect of the magnetic recording apparatus, the first and second voltage-dividing means comprise resistors.

According to the present invention, crosstalk which occurs between photodetection signals can be canceled, an influence of crosstalk between signals on tracking error detection is reduced, and a high-precision tracking error signal can be detected.

BRIEF DESCRIPTION OF THE DRAWINGS

FIG. 5(*c*) is a diagram illustrating the relationship between a conventional photodetector and beams.

DETAILED DESCRIPTION OF THE INVENTION

Embodiment 1

Hereinafter, a first embodiment of the present invention will be described with reference to FIGS. 1, 2 and 8.

Figure 1:
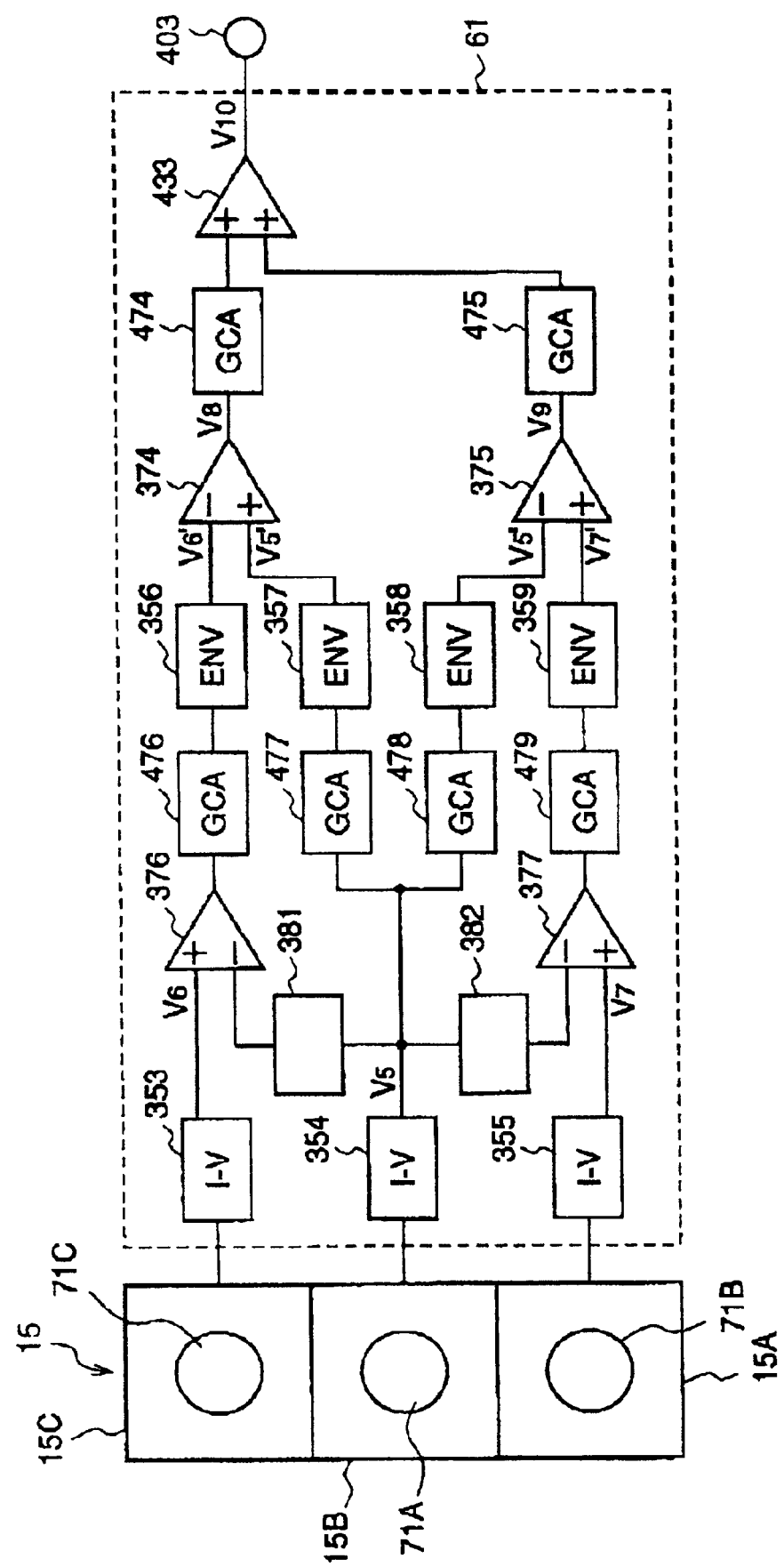
FIG. 1 is a diagram illustrating a structure of a signal processing unit according to a first embodiment of the present invention.

FIG. 1 is a circuit block diagram of a signal processing unit 61 in a magnetic recording apparatus of this embodiment. The same numerals are given to the same parts as those of the signal processing unit 61 in the conventional magnetic recording apparatus shown in FIG. 6, and an explanation thereof is omitted.

Figure 6:
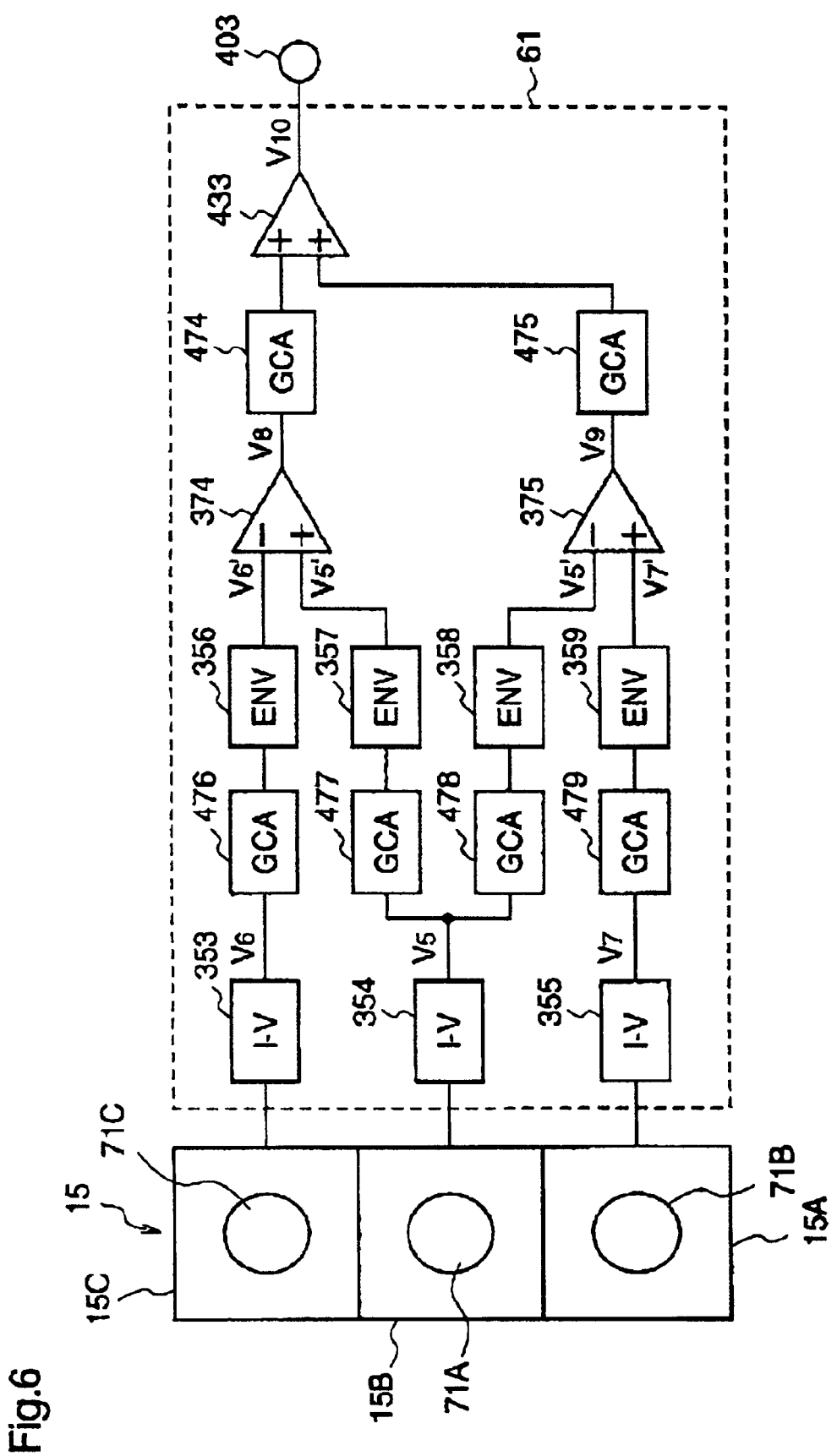
FIG. 6 is a diagram illustrating a structure of a signal processing unit of the conventional magnetic recording apparatus.
Figure 7:
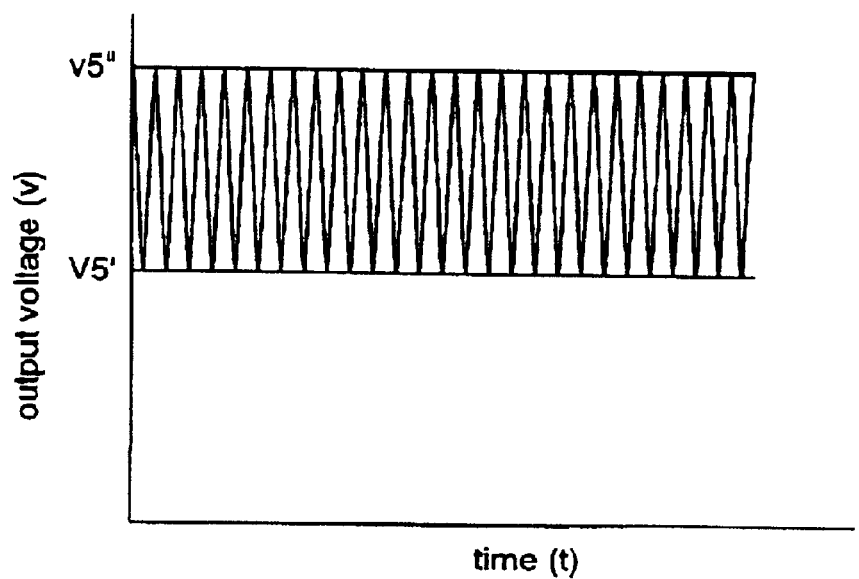
FIGS. 7(*a*) and 7(*b*) are diagrams illustrating a signal waveform in the signal processing unit of the conventional magnetic recording apparatus.
Figure 7:
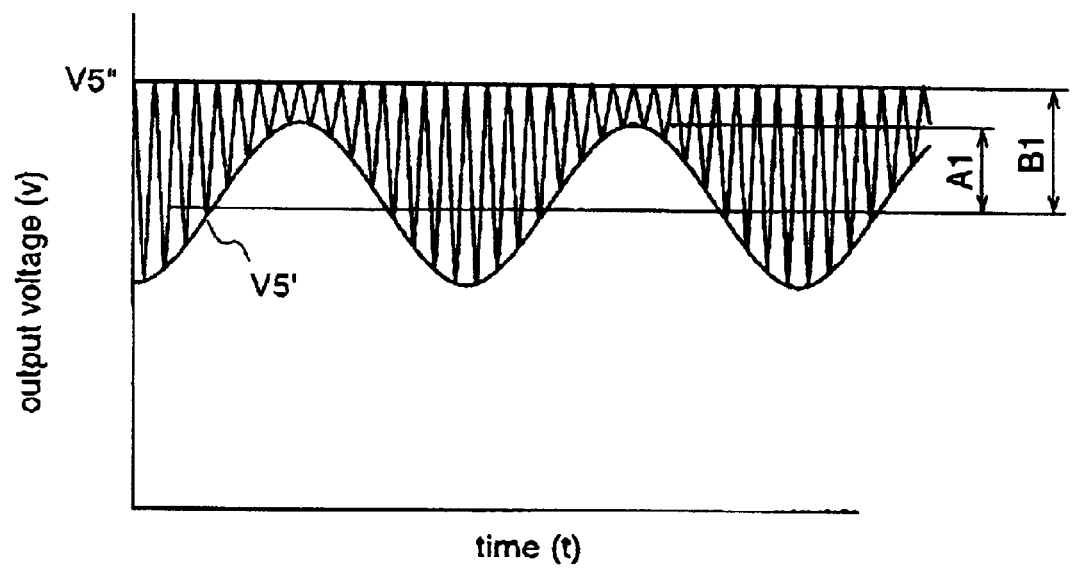

Hereinafter, a description will be given of a point that the signal processing unit 61 according to this embodiment differs from the conventional signal processing unit 61. That is, in the conventional example, an output signal from the I-V converting unit 353 (or 354, 355) is outputted through the variable gain amplifying unit 476 (or 477–479) to an envelope curve detecting unit 356 (or 357–359), as shown in FIG. 6. However, in this embodiment, an output signal from the I-V converting unit 354 is subjected to voltage division by voltage dividing units 381 and 382, and the voltage-divided output signals are subjected to differential calculation with the output signals from the I-V converting units 353 and 355 by differential arithmetic units 376 and 377, respectively, as shown in FIG. 1.

Hereinafter, a description will be given of a reason why the signal processing unit 61 so constructed of this embodiment can cancel crosstalk between signals and detect a tracking error signal with reduced error. Since the signal separation characteristics of the photosensitive parts 15A–15F of the photodetector 15 are not necessarily securable enough on the structure, crosstalk of several percent occurs between the output signals from the photosensitive parts 15A and 15B (or 15D and 15E) or the photosensitive parts 15B and 15C (or 15E and 15F). The shorter the distance between the photosensitive parts is, the greater the increase in the amount of this crosstalk. For example, when the output signal from the photosensitive part 15B crosstalks to the output signal from the photosensitive part 15C (or 15A) at a ratio $\epsilon$, the I-V converting signal v6 (or v7) of the photosensitive part 15C is represented by formula (8).

$$v6 = v6_0 + \epsilon v5 \qquad \text{formula (8)}$$

In formula (8), $v6_0$ is an ideal signal in which no crosstalk occurs between the signals. Accordingly, the amount of crosstalk which is increased as the distance between the photosensitive parts is shortened, can be minimized. It is clear from formula (8) that crosstalk between signals is canceled and an influence of crosstalk on the modulation factor as represented by Formula 1 is prevented by subjecting the I-V converted signal v5 from the photosensitive part 15B to voltage division into the ratio equal to the crosstalk ratio $\epsilon$ and then subjecting this voltage-divided output signal and the I-V converted signal v6 from the photosensitive part 15C to differential calculation.

In this way, according to this embodiment, an output signal among three signals outputted from the photosensitive parts of the photodetector is subjected to voltage division and the voltage-divided signal is subjected to differential calculation with the other output signals, whereby crosstalk between the signals can be canceled, and a tracking error signal with reduced error can be detected.

Further, in the signal processing unit 61 of this embodiment, the output signal from the I-V converting unit is subjected to voltage division and differential calculation. However, wherever the voltage-dividing unit and the differential arithmetic unit are used before the envelope curve detecting unit, crosstalk can be canceled.

Further, the voltage-dividing unit and the differential arithmetic unit are not required to be independent circuits. As shown in FIG. 2, in a typical differential arithmetic amplifier, the voltage-dividing unit and the differential arithmetic unit are easily constructed by setting voltage gains on an inverse input side and on a non-inverse input side at suitable values, respectively. That is, when resistance values (R1–R4) of resistors 501–504 satisfy a condition of formula (9), v5 in formula (8) can be subtracted from v6.

$$R4/(R3+R4) = \epsilon R2/(R1+R2) \qquad \text{formula (9)}$$

Figure 2:
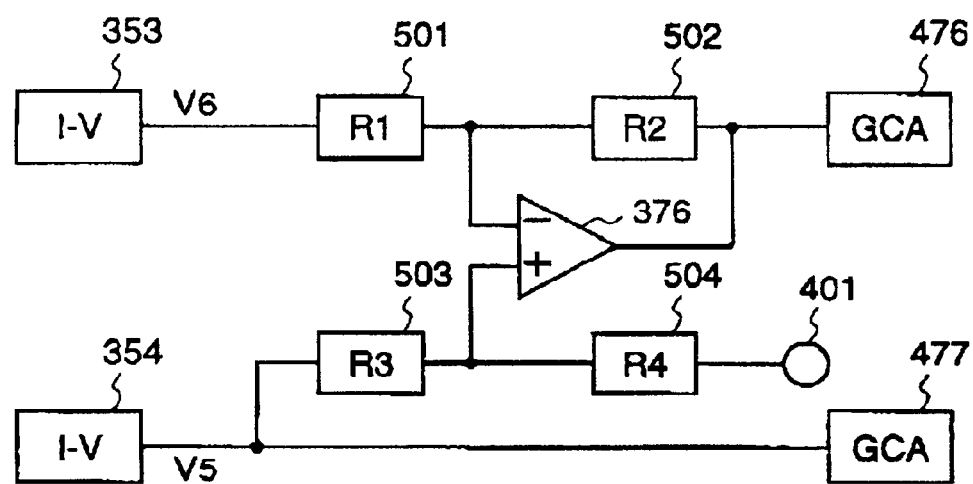
FIG. 2 is a diagram illustrating a cancel circuit according to the first embodiment of the present invention.
Figure 3:
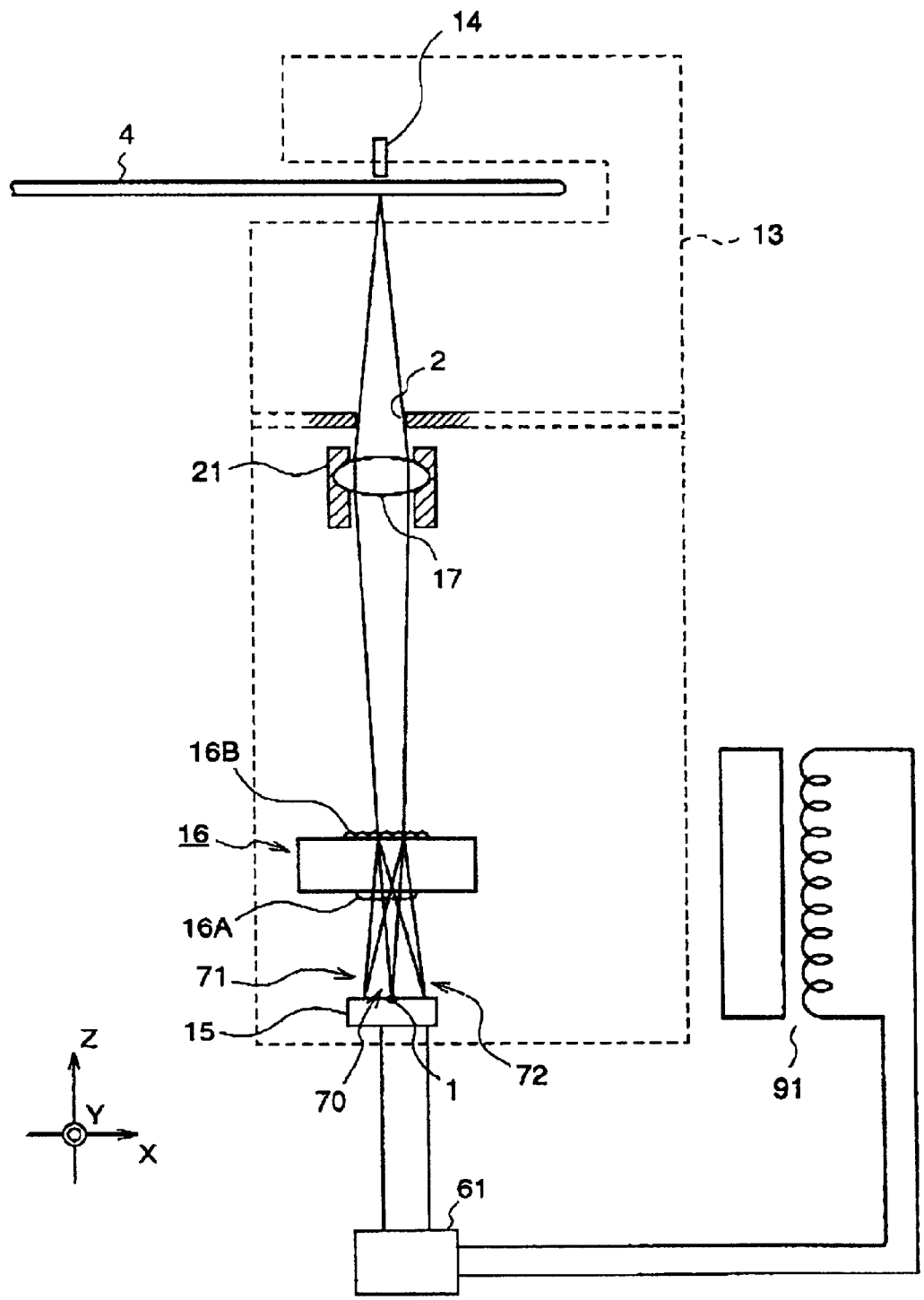
FIG. 3 is a diagram illustrating a structure of a conventional magnetic recording apparatus.
Figure 4:
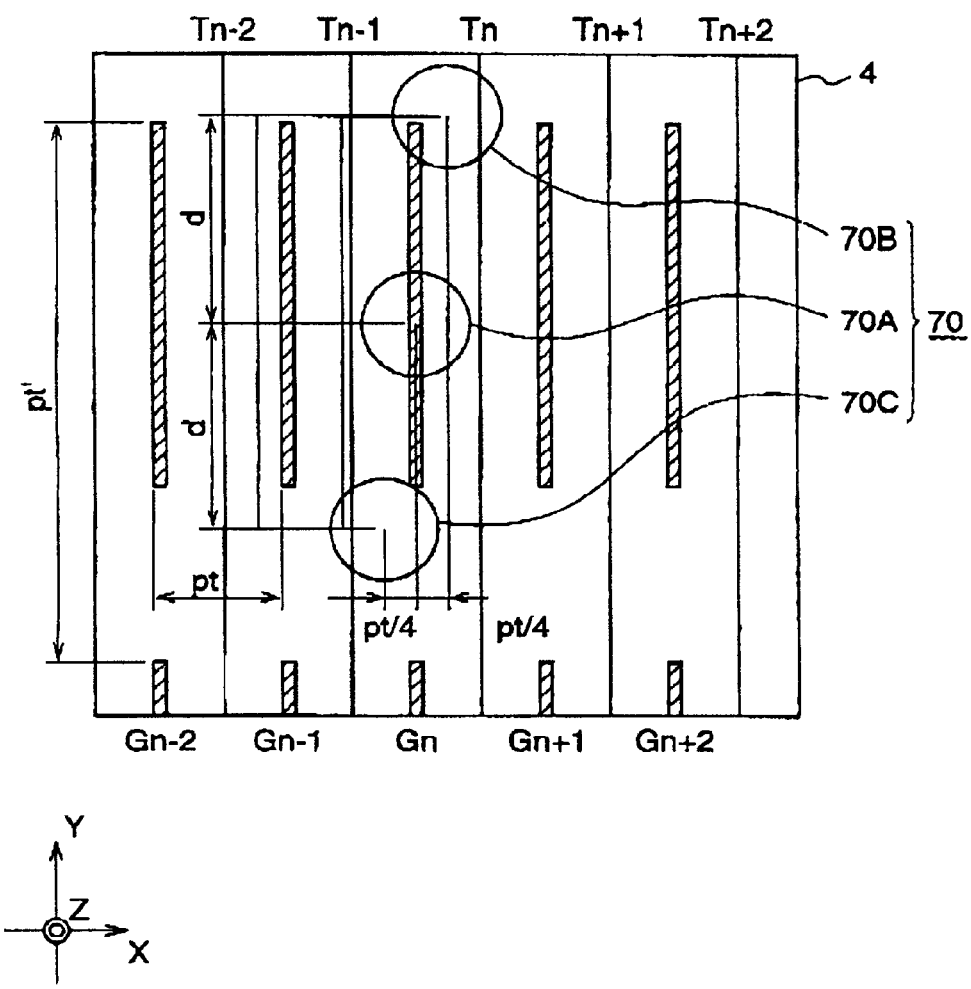
FIG. 4 is a diagram illustrating the relationship between a conventional magnetic recording medium and a condensed beam.
Figure 5:
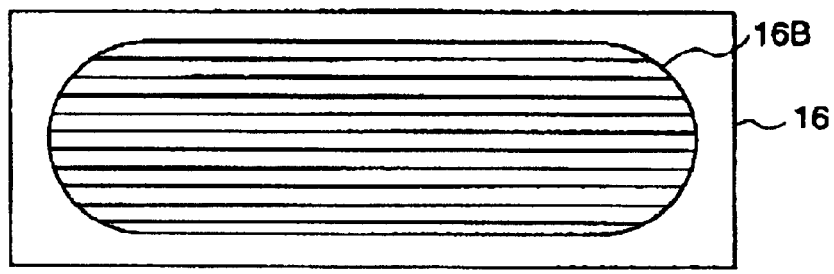
FIGS. 5(*a*) and (*b*) are diagrams illustrating conventional grating patterns of diffraction elements.
Figure 5:
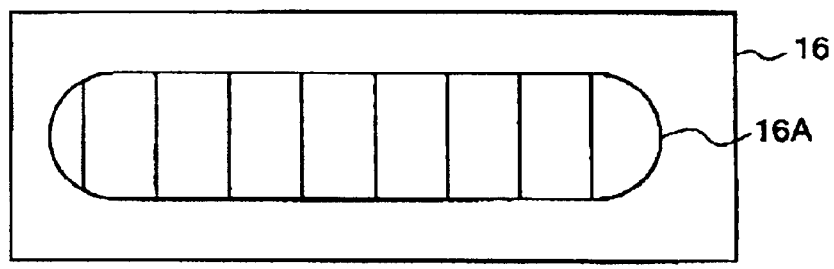
Figure 5:
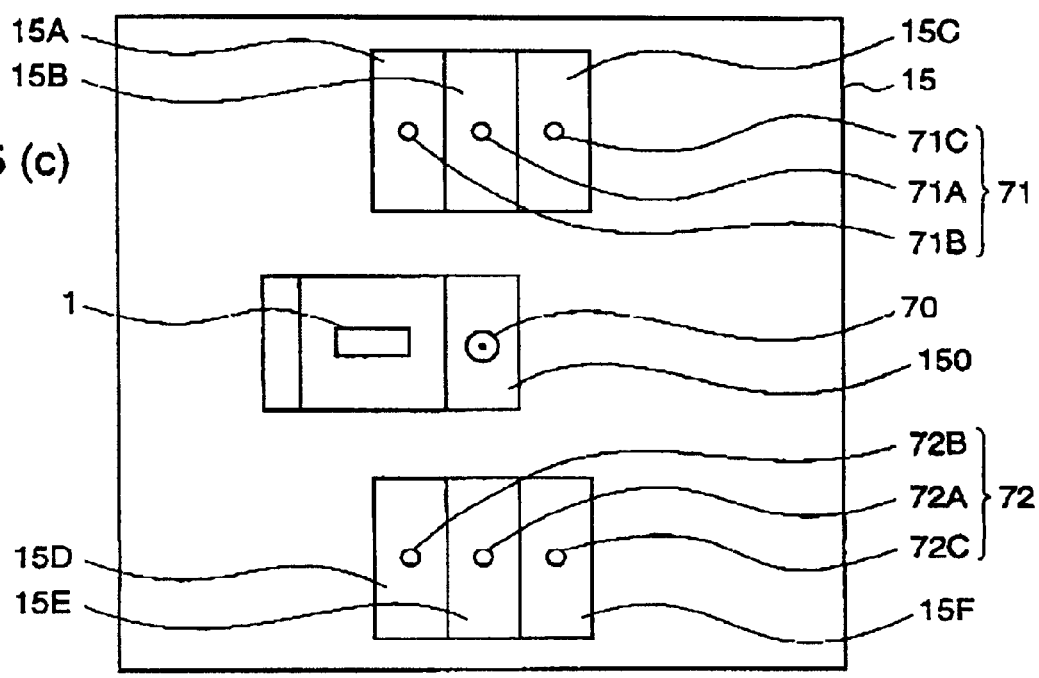

Further, in FIG. 2, a circuit structure where voltage gains on the inverse input side and on the non-inverse input side are determined only by the resistors is described. However, the above-described structure can be implemented also when a resistor, a capacitor, a coil or the like is used singly or combined in series or parallel to make the circuit have appropriate frequency characteristics. Further, crosstalk between the signals can be canceled with higher precision by adjusting the voltage gains on the inverse input side and on the non-inverse input side to the optimum values, employing variable resistors or the like. Moreover, the variable gain amplifying unit 476 (or 479) and the differential arithmetic unit 376 shown in FIG. 1 may be integrated using a digital potentiometer or the like as R2 (a resistor 502) in FIG. 2, to cancel crosstalk.

Figure 8:
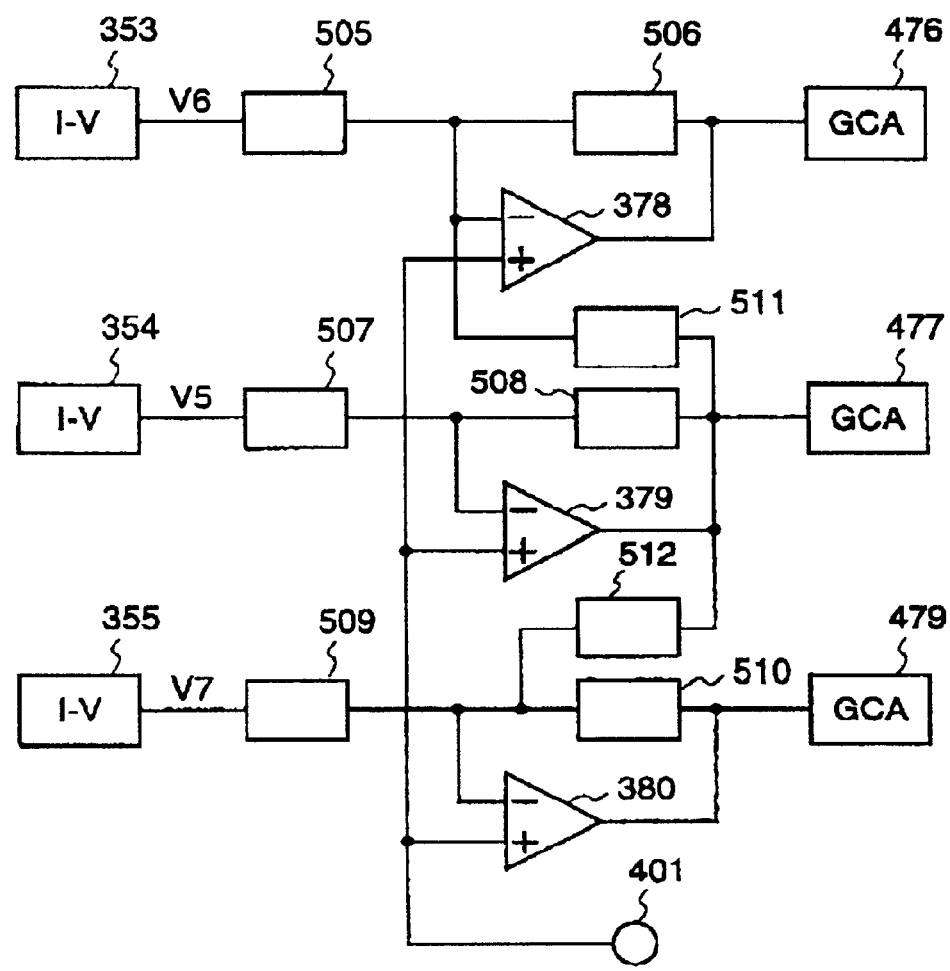
FIG. 8 is a diagram illustrating a deformation example of the cancel circuit according to the embodiment of the present invention.

Further, as shown in FIG. 8, when the output signal from the I-V converting unit 353 (or 354, 355) is amplified by an inverse voltage amplifier composed of the differential arithmetic amplifier 378 (or 379, 380) and resistors 505 and 506 (or 507, 508, 509, 510), the output signal from the differential arithmetic amplifier 379 is inputted through the resistor 511 (or 512) to an inverse input terminal of the differential arithmetic amplifier 378 (or 380), whereby crosstalk can be easily canceled. That is, a voltage gain of the inverse voltage amplifier can be obtained by dividing the resistance value of the resistor 506 by the resistance value of the resistor 511. This voltage gain corresponds to the voltage division ratio at the time when the I-V converted signal is subjected to voltage division by the voltage-dividing units 381 and 382 shown in FIG. 1. Accordingly, here, a typical adder is constituted by the differential arithmetic amplifier 378 (or 380) and resistors 505 (or 509), 511 (or 512), and 506, and the output signal from the differential arithmetic unit 379 is inputted to the differential arithmetic amplifier 378, whereby subtraction of $\epsilon$ v5 in formula (8) from v6 is achieved.

Further, even in the case where the resistors 505, 507, 509, 511 and 512, and a coupling capacitor are connected in series to remove dc components of the signal, crosstalk can be canceled by selecting an appropriate capacitance value.

INDUSTRIAL APPLICABILITY

As described above, the magnetic recording apparatus according to the present invention detects a high-precision tracking error signal, with stability, and it is suitable for recording, reproducing or deleting information on/from a magnetic recording medium, such as a fixed magnetic disc or a floppy disc.

What is claimed is:

1. A magnetic recording apparatus comprising:

a disk-shaped information recording medium on which periodic physical changes providing changes of reflectivity are formed;

a light source operable to output a light beam;

a diffraction element operable to generate three light beams from the light beam outputted by the light source;

a light-converging optical system operable to converge the three light beams generated by the diffraction element on the disk-shaped information recording medium as a microspot;

a photodetection means having three photosensitive parts operable to receive light beams reflected and diffracted by the disk-shaped information recording medium and transmitted through the light-converging optical system, and output signals in accordance with quantities of the received light beams, respectively;

a signal processing means for processing the signals outputted from the photodetection means to output a tracking error signal, the signal processing means including a cancel means for canceling crosstalk that occurs between the signals outputted from the three photosensitive parts of the photodetection means;

a driving means for receiving the tracking, error signal outputted from the signal processing means, and determining a position of the light beam on a desired track of the disk-shaped information recording medium; and a magnetic head operable to record information on the disk-shaped information recording medium, or reproduce or delete information from the disk-shaped information recording medium, wherein the cancel means comprises:

first and second voltage-dividing means for performing voltage division on the signal output respectively from a first photosensitive part of the three photosensitive parts of the photodetection means;

a first differential arithmetic means for performing differential calculation on the signal output respectively from a second photosensitive part of the three photosensitive parts of the photodetection means and an output signal from the first voltage-dividing means; and a second differential arithmetic means for performing differential calculation on the signal output respectively from a third photosensitive part of the three photosensitive parts of the photodetection means and an output signal from the second voltage-dividing means.

2. The magnetic recording apparatus of claim 1, wherein the first and second voltage-dividing means have voltage-dividing ratios approximately equal to a ratio at which the output signal from the first photosensitive part crosstalks to the output signals from the second and third photosensitive parts.

3. The magnetic recording apparatus of claim 1, wherein the first and second voltage-dividing means comprise resistors.

4. A magnetic recording apparatus comprising:

a light source operable to output a light beam;

a diffraction element operable to generate three light beams from the light beam outputted by the light source;

a light-converging optical system operable to converge the three light beams generated by the diffraction element on an information recording medium as a microspot;

a photodetection means having three photosensitive parts operable to receive light beams reflected and diffracted by the information recording medium and transmitted through the light-converging optical system, and output signals in accordance with quantities of the received light beams, respectively;

a signal processing means for processing the signals outputted from the photodetection means to output a tracking error signal, the signal processing means including a cancel means for canceling crosstalk that occurs between the signals outputted from the three photosensitive parts of the photodetection means;

a driving means for receiving the tracking error signal outputted from the signal processing means, and determining a position of the light beam on a desired track of the information recording medium; and a magnetic head operable to record information on the information recording medium, or reproduce or delete information from the information recording medium, wherein the cancel means comprises:

first and second voltage-dividing means for performing voltage division on the signal output respectively from a first photosensitive part of the three photosensitive parts of the photodetection means;

a first differential arithmetic means for performing differential calculation on the signal output respectively from a second photosensitive part of the three photosensitive parts of the photodetection means and an output signal from the first voltage-dividing means; and a second differential arithmetic means for performing differential calculation on the signal output respectively from a third photosensitive part of the three photosensitive parts of the photodetection means and an output signal from the second voltage-dividing means.

5. The magnetic recording apparatus of claim 4, wherein the first and second voltage-dividing means have voltage-dividing ratios approximately equal to a ratio at which the output signal from the first photosensitive part crosstalks to the output signals from the second and third photosensitive parts.

6. The magnetic recording apparatus of claim 4, wherein the first and second voltage-dividing means comprise resistors.

* * * * *